United States Patent [19]
Choate

[11] Patent Number: 5,523,583
[45] Date of Patent: Jun. 4, 1996

[54] TELECENTRIC VARIABLE MAGNIFICATION OPTICAL SYSTEM FOR VIDEO BASED INSPECTION SYSTEM

[75] Inventor: Albert G. Choate, Rush, N.Y.

[73] Assignee: Optical Gaging Products, Inc., Rochester, N.Y.

[21] Appl. No.: 415,631

[22] Filed: Apr. 3, 1995

[51] Int. Cl.$^6$ .................................................. G01N 21/86
[52] U.S. Cl. ................................ 250/559.19; 250/201.5; 359/363
[58] Field of Search .......................... 250/559.19, 559.46, 250/201.4, 201.3, 201.5; 354/195.12; 359/363, 383, 384, 373–374, 663, 676, 421–422; 348/358; 356/237, 394, 371, 240

[56] References Cited

U.S. PATENT DOCUMENTS 4,208,089  6/1980  Netto .......................................... 359/363
5,461,228  10/1995  Kirkman et al. .................... 250/223 B Primary Examiner—Que T. Le
Attorney, Agent, or Firm—Shlesinger Fitzsimmons Shlesinger

[57] ABSTRACT

A video camera and a set of telecentric imaging lenses are mounted in spaced relation on a reciprocable support for movement in unison by the support toward and away from a workpiece to focus its magnified image, which is projected by the imaging lenses to the camera for recording and display thereby. The imaging lenses are fixed to the support, but the camera is mounted for limited movement on the support toward and away from the fixed lenses to vary the magnification of the projected image. An iris diaphragm is secured to the support between the camera and the lenses and has an adjusting ring connected to the video camera for movement thereby upon adjustment of the camera relative to the support, thereby to alter the diameter of the opening in the iris diaphragm in response to camera movement on the support.

20 Claims, 3 Drawing Sheets

TELECENTRIC VARIABLE MAGNIFICATION OPTICAL SYSTEM FOR VIDEO BASED INSPECTION SYSTEM

BACKGROUND OF THE INVENTION

This invention relates to metrological apparatus, and more particularly to apparatus of the type employed for automated optical inspection of manufactured objects, particularly in regard to the determination of precise dimensional measurements of such objects. Even more particularly this invention relates to an improved variable magnification optical system and associated video camera for accurately performing computerized image analysis and dimensional measurements of such objects.

Metrological apparatus of the type described normally includes a support for the object upon which dimensional measurements are to be made, and some means for precisely moving either the object or the associated video camera which is employed for recording or displaying a magnified image of the object that is being inspected. Such apparatus in addition to being able to perform measurements in a horizontal or X-Y plane, also may include autofocus means for determining heights of the object in the Z direction normal to the X-Y plane. In this manner such apparatus is capable of producing a full, three-dimensional inspection of the object.

Heretofore, as disclosed for example in U.S. Pat. No. 5,389,774, it has been customary normally to employ in a video inspection system of the type described a conventional zoom lens comprising multiple moving lens elements or lens groups to vary focal length, and to maintain focus. These moving elements tend to be very sensitive, thus making it extremely difficult to achieve precise repeatability in regard to magnification, location and focus. Moreover, typical such zoom lenses are not telecentric, so that the position of the object within the depth of focus significantly affects apparent size of the object, particularly at lower magnifications and at larger fields.

Although as disclosed in U.S. Pat. No. 4,743,771 video based inspection systems have been designed to move both the video camera and associated objective or imaging lens system in unison toward and away from the work that is being inspected, such systems do not enable satisfactory variation of the magnification of an image.

To obviate some of those problems heretofore encountered, it is an object of this invention to provide an improved video based inspection system which employs fixed optical elements in telecentric imaging lenses for effecting zoom-magnification of images.

Still another object of this invention is to provide an improved zoom-magnification system of the type described wherein magnification variation is achieved by moving the video camera relative to the imaging lenses, while in turn mounting both the camera and imaging lenses for movement as a unit in order to maintain proper focus of an object that is being inspected.

A further object of this invention is to provide an improved system of the type described wherein the video camera is connected via mechanical coupling means to an adjustable iris diaphragm, so that movement of the camera will provide automatic and proper adjustment of the aperture in the associated iris diaphragm thereby to synchronize diaphragm aperture and magnification with camera position.

Other objects of this invention will be apparent hereinafter from the specification and from the recital of the appended claims, particularly when read in conjunction with the accompanying drawings.

SUMMARY OF THE INVENTION

The work to be inspected is positioned on the surface of a table beneath a series of telecentric imaging lenses that are secured to a system support plate to overlie the work. The lenses have an optical axis disposed vertically and coaxially of an adjustable stop or iris diaphragm, which is mounted in a central opening formed in a platform that projects horizontally from the face of the system support plate to overlie the imaging lenses. Above the diaphragm a video camera is mounted for vertical movement on the face of the support plate with the camera image detector facing downwardly and coaxially of the diaphragm. A lead screw, which is mounted on the system support plate for rotation selectively in opposite directions about a vertical axis parallel to the optical axis, is attached at its lower end to the input of a speed reducer that is mounted on the platform containing the diaphragm. The lead screw has mounted thereon a drive nut which is operatively connected to the video camera so that vertical motion of the drive nut along the lead screw is imparted to the video camera. The camera is thus shifted vertically on the support plate relative to the diaphragm and the telecentric imaging lenses whenever the lead screw is rotated. Also, the output of the speed reducer is connected via a gear mechanism and pin to an adjusting ring which is rotatable on the diaphragm to adjust the diaphragm opening in response to vertical movement of the camera. The adjustment of the aperture in the diaphragm is thus synchronized with the vertical movement of the video camera.

In addition, the system support plate is mounted for vertical adjustment on a vertical slide, so that the entire assembly (the camera, the diaphragm and the imaging lens system) can be moved as a unit vertically relative to the work, whereby magnification variation is achieved by moving the camera relative to the lens system, while focus is maintained by moving the support plate, and hence the entire system thereon relative to the work. Also, a beam splitter is positioned coaxially beneath the imaging lenses and registers at one side thereof with the output of a fiber optic illuminator the light from which is directed downwardly by the splitter onto the work. A ring of light which surrounds the beam splitter also is operable to direct light onto the work.

THE DRAWINGS

DETAILED DESCRIPTION OF THE PREFERRED EMBODIMENTS

Figure 1:
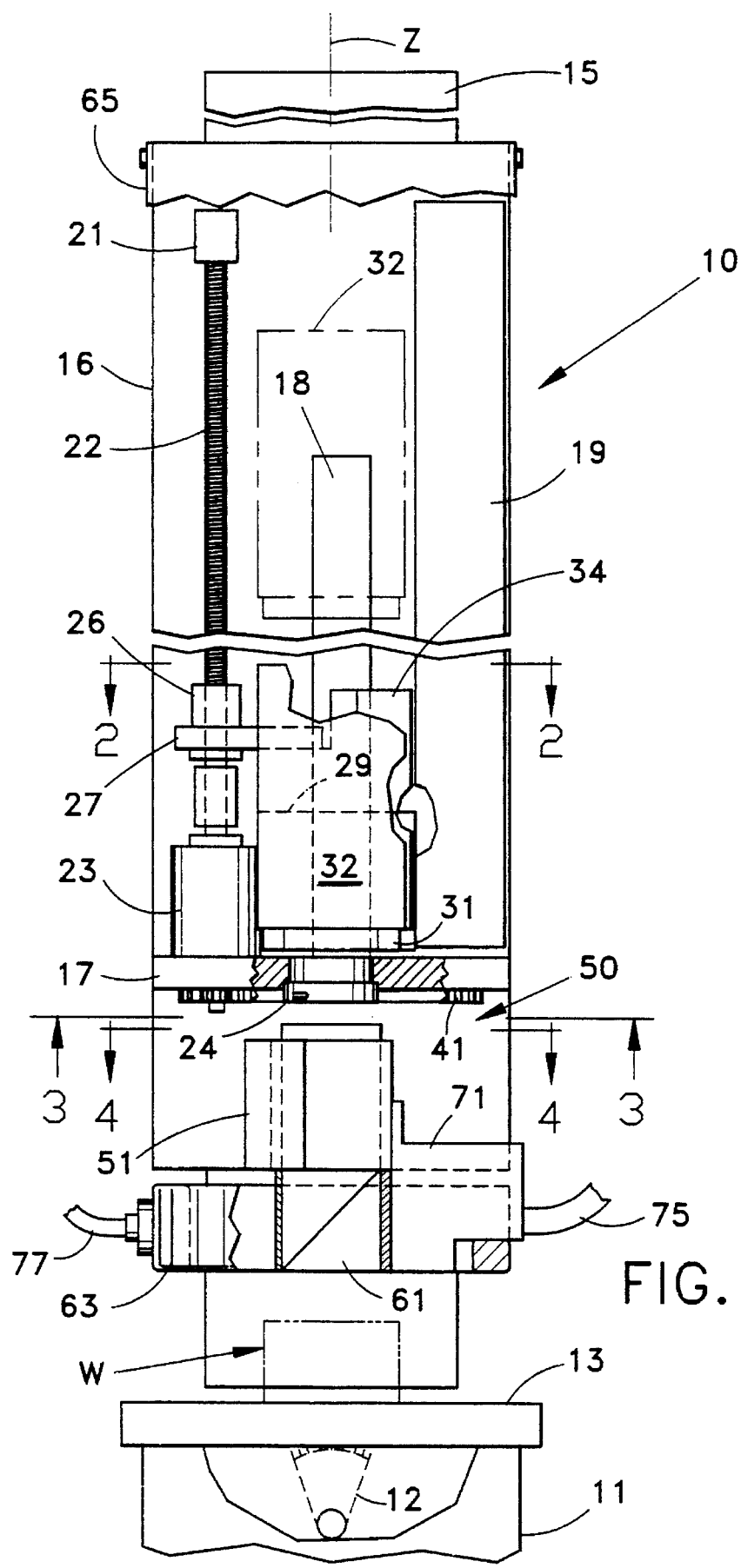
FIG. 1 is a fragmentary front elevational view illustrating schematically, and partially in section apparatus forming an improved video based inspection system made according to one embodiment of this invention.

Referring now to the drawings by numerals of reference, and first to FIG. 1, 10 denotes generally an improved video based inspection system comprising a table or stand 11 having thereon a conventional substage collimator or light source 12, which is disposed to project illumination upwardly through an opening or transparent portion in the work support surface 13 of the stand 11, and against the underside of a workpiece W which is disposed to be mounted on surface 13 in a conventional manner. For purposes of discusssion, it will be assumed that the surface 13 is disposed in a horizontal plane, and the workpiece W is mounted thereon in a conventional manner for adjustment selectively in X and Y directions which are at right angles to each other. Mounted above the work surface 13 is a precision slide 15 of conventional design. The face of slide 15 lies in a vertical plane parallel to a vertical axis Z that extends normal to the work surface 13. Mounted on slide 15 for vertical, reciprocable movement adjacent its face is an elongate, rectangular mounting plate 16, which carries the hereinafter described video camera and zoom lens system. Adjacent its lower edge plate 16 has secured to and projecting at right angles from the face thereof an iris diaphragm or stop mounting plate 17, the outer surface of which is rounded as noted hereinafter. Secured to and projecting slightly from the face of plate 16 intermediate its longitudinal side edges, and extending for almost the full length of plate 16 is an elongate guide rail 18. Also secured to the face of plate 16 adjacent one side thereof (the right side as shown in FIG. 1), and extending longitudinally of the plate 16 is an elongate, graduated scale 19, the purpose of which will be noted hereinafter.

Mounted on the face of plate 16 adjacent the upper end thereof, and adjacent the side thereof remote from the side to which scale 19 is attached, is a reversible electric motor 21. The drive shaft of motor 21 is coupled in a conventional manner to the upper end of an elongate, vertically disposed lead screw 22, the lower end of which is also coupled in a conventional manner to the input of a speed reducer 23 that is mounted on the upper surface of the diaphragm mounting plate 17. The output of reducer 23 is connected, as noted in greater detail hereinafter, to an adjustable iris diaphragm 24 which is mounted on the underside of plate 17 with its axis disposed coaxially of axis Z.

Figure 2:
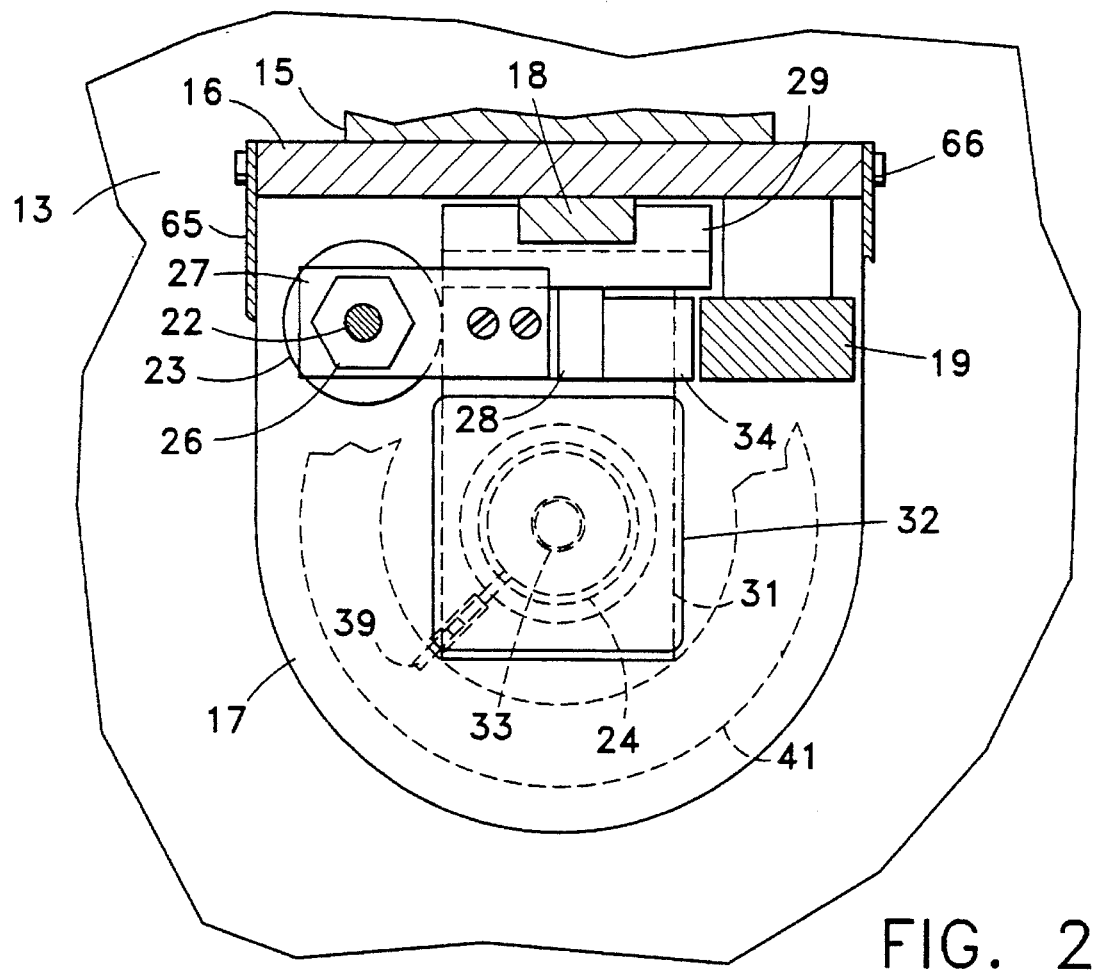
FIG. 2 is a fragmentary sectional view of this apparatus on a slightly larger scale, and taken along the line 2—2 in FIG. 1 looking in the direction of the arrows.

A drive nut 26, which is mounted for vertical travel on screw 22 between motor 21 and the reducer 23, is connected by a bracket 27 to a spacer block 28 that is fastened to the face of a carriage 29. Carriage 29 is mounted in a conventional manner on rail 18 by recirculating ball bearings (not illustrated) for vertical movement in response to the rotation of drive screw 22. A flat bracket or plate 31 is secured adjacent its rear edge to the underside of carriage 29 for movement therewith, and projects horizontally forwardly over plate 17. A video camera 32 has its circular lens mount housing 33 (FIG. 2) secured coaxially in an opening formed in bracket 31 forwardly of the block 28, and coaxially of the diaphragm 24. The vertical position of camera 32 is determined by a scale reader 34 (FIG. 2), which is carried by block 28 at the side thereof remote from bracket 27 to register with the face of scale 19. The bracket 31 and carriage 29 support the video camera 32 so that its image detector registers coaxially with the diaphragm 24, and with the imaging lenses of a fixed telecentric zoom lens system that is mounted on plate 16 beneath plate 17, and which is denoted generally by numeral 50.

Figure 3:
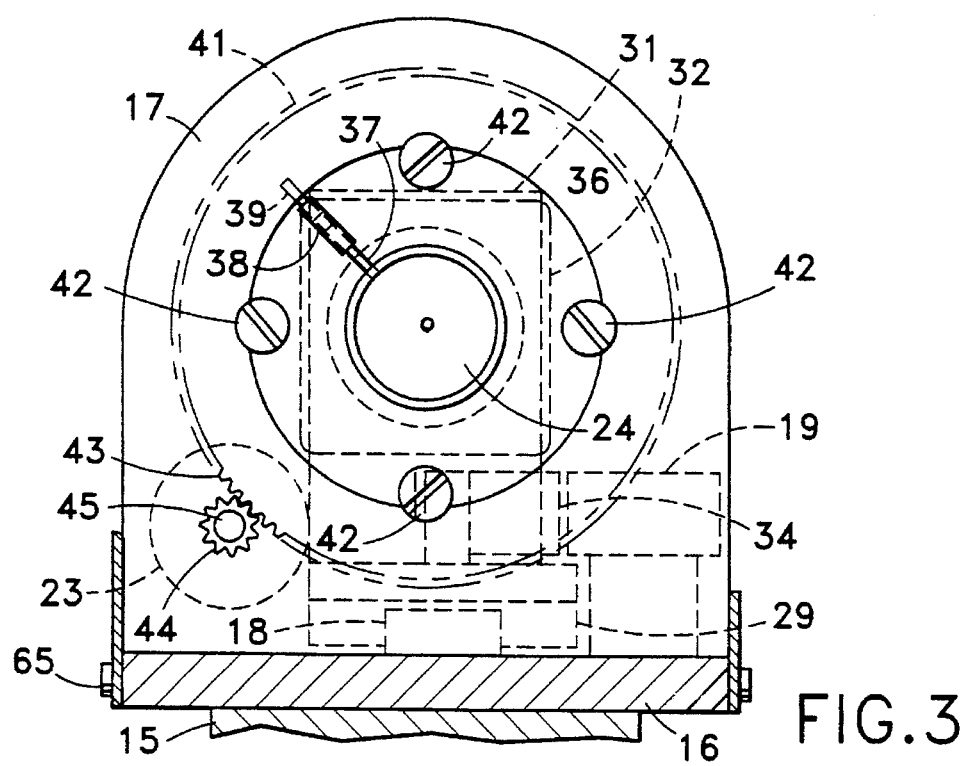
FIG. 3 is a fragmentary sectional view on a scale slightly larger than FIG. 2, and taken along the line 3—3 in FIG. 1 looking in the direction of the arrows.

Referring now to FIG. 3, the diaphragm 24 is mounted in a conventional diaphragm housing the upper end of which is secured in a central opening in plate 17, and the lower end of which has mounted thereon for rotation immediately beneath the underside of plate 17, and coaxially the axis Z, a diaphragm adjusting ring 36. Secured at one end to the outer peripheral surface of ring 36, and projecting radially outwardly therefrom is a diaphragm setting pin 37. Pin 37 projects coaxially into a one end of a tubular connecting sleeve 38, the opposite end of which is seated over another pin 39 that projects radially from the inner peripheral surface of a ring gear 41. Gear 41 is mounted beneath the underside of plate 17 by a plurality of guide bolts 42 for rotation coaxially of the axis Z, and in radially spaced relation to the diaphragm ring 36. The shanks of bolts 42 thread part way into the underside of plate 17 and slidably engage the inner peripheral surface of gear 41 at angularly spaced points about its axis, while the heads of the bolts overlie the underside of gear 41, whereby the bolts 42 thus support the gear for rotation coaxially of the axis Z. Also, the pin 39, via the sleeve 38 in pin 37, transmits the rotation of gear 41 to the diaphragm ring 36.

In order to apply rotation to the ring gear 41, the teeth 43 in the outer periphery thereof are drivingly engaged with the teeth of a pinion 44, which is secured to the output shaft 45 of the speed reducer 23 at the underside of plate 17. Thus, the rotation of the lead screw 22 is imparted, as noted hereinafter, through the speed reducer 23 and its pinion 44 to the ring gear 41. Gear 41, in turn, rotates the diaphragm adjusting ring 36 in a predetermined ratio relative to the vertical movement that is imparted to the carriage 29, and hence camera 32, via the lead screw 22 and drive nut 26. Merely by way of example, the speed reducer 23 and associated gearing may be selected such that 13.2 inches of vertical movement of camera 32 will rotate ring 36 approximately 90°. Ring 36 in turn may adjust the diameter of the aperture in the diaphragm 24 between limits of 1.8 mm to 18 mm.

Figure 4:
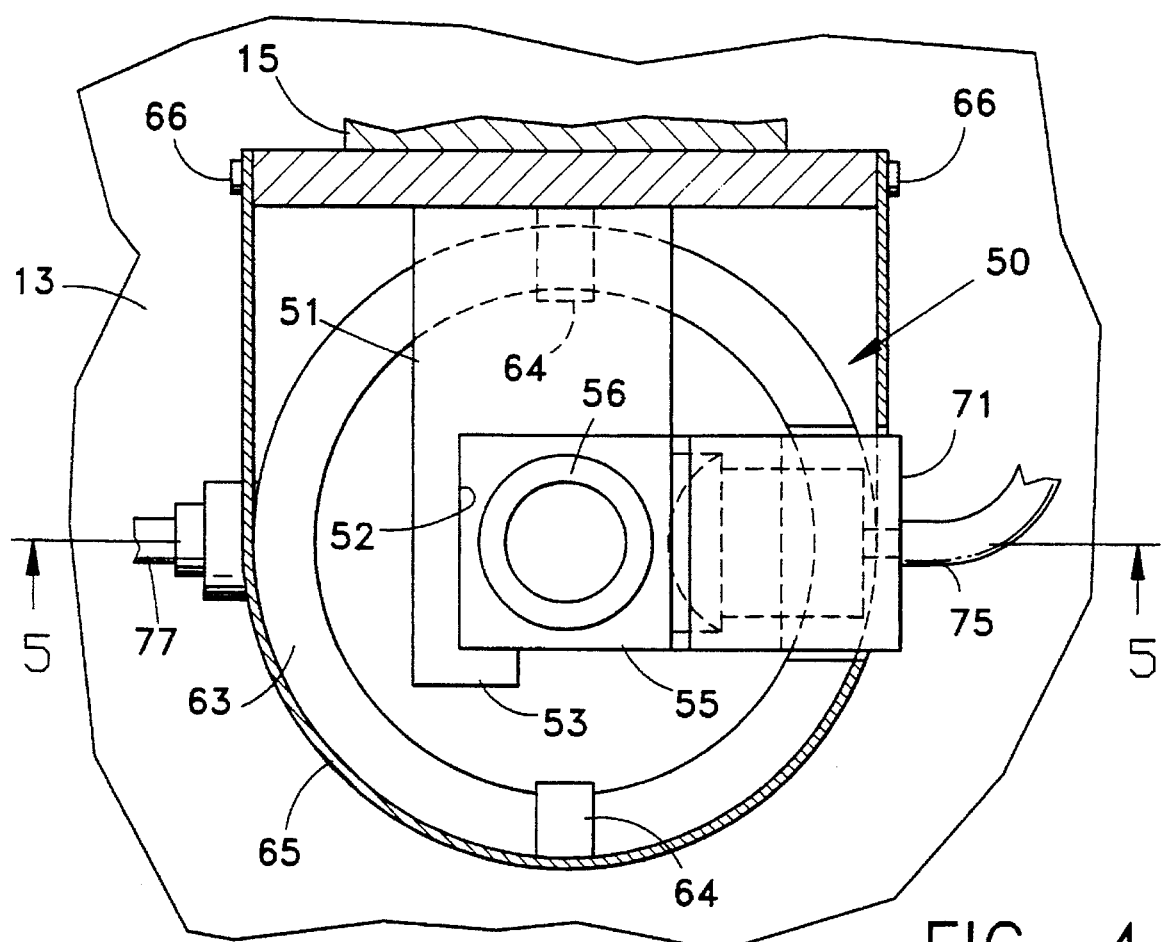
FIG. 4 is a fragmentary sectional view of the scale of FIG. 3 and taken along the line 4—4 in FIG. 1 looking in the direction of the arrows.
Figure 5:
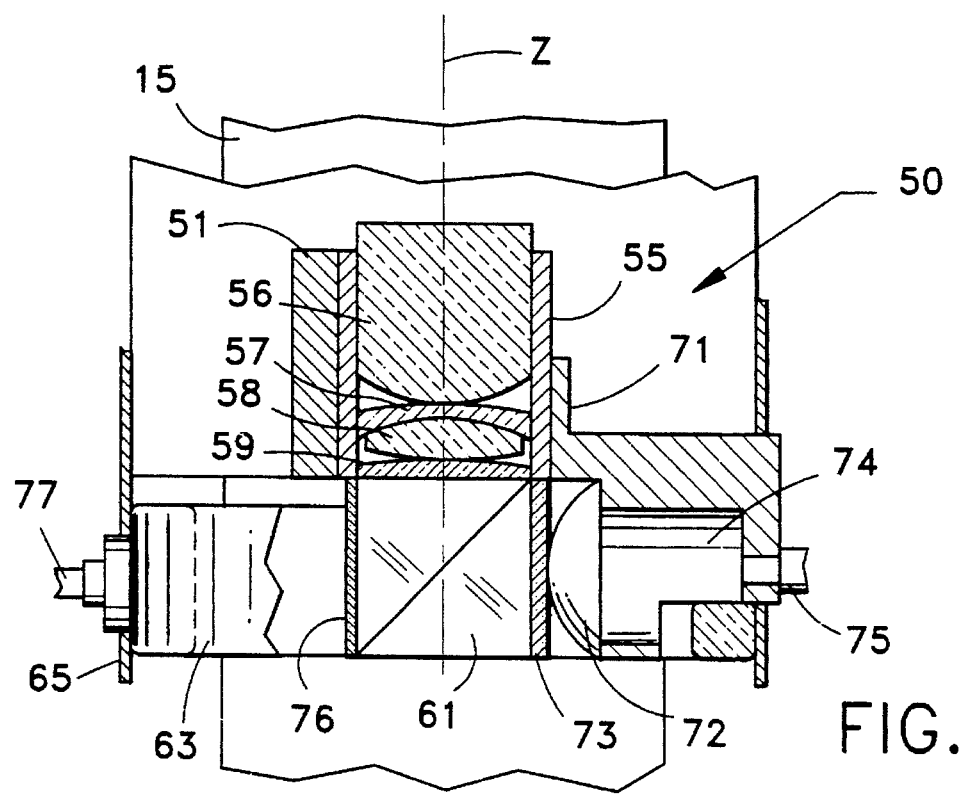
FIG. 5 is a fragmentary sectional view taken generally along the line 5—5 in FIG. 4 looking in the direction of the arrows.

Referring now to FIGS. 4 and 5, the telecentric zoom lens assembly 50 is supported on a large, rectangular block 51 which is fastened to, and which projects from the face of plate 16 centrally thereof. Adjacent its outer end block 51 has therethrough a vertically extending, generally rectangularly shaped notch 52, which extends inwardly from one side of the block 51 (the right side thereof as shown in FIG. 4), and the center of which is disposed coaxially of the axis Z. A portion of the block 51 forming the outer end of notch 52 (the lower end of the notch as shown in FIG. 4) is cut away so that only a lateral flange portion 53 of the block 51 overlies the forward side of notch 52. Secured in the notch 52 in block 51 is a rectangularly shaped lens barrel 55, which has therethrough an axial bore the centerline of which is disposed coaxially of the axis Z. Cemented in the upper end of the bore in barrel 55 by a conventional UV curing cement, or the like, is a large magnifying lens 56. Cemented coaxially in the same bore beneath the lens 56 are the lenses 57, 58 and 59, which form a conventional triplet system, and which are of the standard plano-concave, double convex and negative-meniscus configurations, respectively. The plane underside of lens 59 registers approximately with the bottom of the lens barrel 55, and has cemented thereto a beam splitter 61.

Beam splitter 61 extends downwardly into the center of a large, circular ring light 63, which is supported in a conventional manner by bracket 64 that project from the face of the plate 16, and the inside surface of an elongate, generally U-shaped cover 65. Cover 65, which is shown only fragmentarily in the drawings, encloses the camera 29 and associated equipment mounted on the face of plate 16. As shown in FIG. 4, the longitudinal side edges of the cover 65 are secured at spaced points therealong by screws 66 to the opposed, longitudinal side edges of plate 16. Light from the ring 63 is disposed to be directed coaxially downwardly and obliquely onto the work supported on the work surface 13.

Secured to one side of the lens barrel 55 (the right side thereof as shown in FIG. 4), and extending downwardly beneath the barrel and adjacent to the beam splitter 61, is a surface illuminator block 71. Secured in a circular recess formed in the side of the block 71 that faces the beam splitter 61 is a segmental spherical lens 72 having its spherically shaped face confronting upon a bandpass filter 73 that is secured to the confronting side of the beam splitter 61. Rearwardly of the lens 72 the block 71 has therein a bore 74 which communicates with the discharge end of a fiber optic bundle 75, which is adapted to direct light from a fiber-optic illuminator (not illustrated) through the bore 74 to the lens 72. Lens 72 then directs light into the beam splitter 61, which in turn directs the light downwardly onto the surface of the work W positioned therebeneath on surface 13. To complete the telecentric lens system 50, it is advisable to secure a light absorbing filter 76 to the side of the beam splitter 61 remote from the filter 73. As in the case of the fiber optic bundle 75, a similar such bundle 77 is disposed to connect the ring light 63 to another source of illumination.

In use, it will be understood that the camera 32 is adapted to be coupled in known manner by a microprocessor or central processing unit (CPU) to a video monitor, such as taught for example in the above-noted U.S. Pat. No. 5,389,774, which is assigned to the same assignee as the present application. The plate 16 is adpated to be driven vertically, and parallel to axis Z by a conventional motorized and digitally controlled positioning apparatus which forms no part of this invention. The carriage 29, which carries the video camera 32, is adapted to be driven vertically and selectively and in opposite directions on rail 18 by the motor 21, during which movement the scale reader 34, in response to the graduated face of scale 19, generates a signal indicative of the vertical position of camera 32 on plate 16. The above-noted CPU, to which the camera 32 is coupled may be utilized to control the drive mechanism for plate 16, and the selective energization of motor 21. However, unlike the video zoom-magnification system disclosed in the last-mentioned patent, the system disclosed herein does not utilize a conventional zoom lens of the type in which multiple moving lens elements or lens groups are adjusted to vary focal length and to maintain focus. Instead, the lens system 50 employs fixed telecentric imaging lenses, and magnification variation is effected by moving camera 32 vertically relative to the lens system 50 while the entire system supported on plate 16 (the camera 32 and the lens system 50) are moved vertically on slide 15 in order to maintain focus.

Typically, the variable diameter of the diaphragm or telecentric stop 24 is used to maintain a constant F-number or numerical aperture at the image, which then produces a constant image resolution and intensity over the range of magnifications. The aperture diameter is then proportional to magnification, which also permits an extended magnification range of ideal diffraction limited performance, since at low magnifications and large fields the lens is effectively "stopped down" and optical aberrations are reduced.

While this invention has been illustrated and described in detail in connection with only certain embodiments thereof, it will be apparent to one skilled in the art that other means of positioning the object under inspection in relation to the imaging system, or for adjusting the relative location of the imaging lens and camera to achieve desired magnification and proper focus, may be employed without departing from this invention. Also, if desired, the telecentric aperture control could be achieved by other means, whether manually or automatically operated. And it is intended that this application cover all such modifications that fall within the scope of one skilled in the art or the appended claims.

I claim:

1. In video based metrological apparatus of the type in which a video camera is employed to record and display the magnified image of a workpiece positioned on a work supporting surface, the improvement comprising a support mounted for reciprocation above and transversely of said work supporting surface, means mounting a video camera on said support for movement thereby toward and away from the workpiece on said surface, and with the image detector of the camera facing said workpiece, and a fixed telecentric lens system secured to said support between said camera and said workpiece and operative to project a magnified image of said workpiece to said camera for recording thereby, said mounting means including means for moving said camera on said support in a predetermined path relative to said support, and selectively toward and away from said telecentric lens system, thereby selectively to vary the magnification of the image recorded by said camera, and said support being operable to move said camera and said lens system simultaneously and in unison, and selectively toward and away from said workpiece to maintain said workpiece in desired focus.

2. Apparatus as defined in claim 1, wherein said fixed telecentric lens system comprises a plurality of imaging lenses secured against movement with respect to each other on said support, and having an optical axis disposed coaxially of the image detector of said camera.

3. Apparatus as defined in claim 2, including an adjustable iris diaphragm mounted on said support between said camera and said imaging lenses and having a central opening therein disposed coaxially of said optical axis.

4. Apparatus as defined in claim 3, including means coupling said iris diaphragm to said camera, and operative to effect adjustment of said central opening in said diaphragm in proportion to the movement of said camera with respect to said support.

5. Apparatus as defined in claim 2, including a lens holder fixed to said support between said camera and said work supporting surface, and having therethrough an opening disposed coaxially of said camera image detector and said optical axis, said imaging lenses being fixed coaxially in said opening in said lens holder, and an iris diaphragm mounted on said support between said camera and said imaging lenses for movement with said support, and having therethrough a central opening disposed coaxially of said optical axis.

6. Apparatus as defined in claim 5, wherein said central opening in said iris diaphragm is axially spaced a fixed distance from said imaging lenses.

7. Apparatus as defined in claim 5, including means for adjusting the diameter of said central opening in said iris diaphragm, and means coupling said adjusting means to said means for moving said camera on said support, whereby movement of said camera on said support produces a related adjustment of the diameter of said opening in said iris diaphragm.

8. Apparatus as defined in claim 7, wherein said coupling means comprises, a lead screw mounted on said support adjacent the path of movement of said camera, and for rotation selectively in opposite directions about an axis parallel to said optical axis, means connecting said lead screw to said camera to effect movement thereof in said predetermined path, and speed reducing means connecting said lead screw to said adjusting means to effect adjustment of said diameter of the opening in said diaphragm at a rate less than the rate of movement of said camera on said support.

9. Apparatus as defined in claim 5, including a beam splitter cube secured to one of said lenses centrally thereof, and extending externally of said bore in said lens holder to register with a workpiece on said supporting surface, and means for directing light from a source thereof into said beam splitter from one side thereof, and for projection by said beam splitter onto the surface of said workpiece coaxially of said optical axis.

10. Apparatus as defined in claim 9, including a bandpass filter secured to said one side of said beam splitter, and a light absorbing filter is secured to the opposite side thereof.

11. Apparatus as defined in claim 10, including a ring light mounted on said support in radially spaced, surrounding relation to said beam splitter to direct light obliquely onto said workpiece.

12. Apparatus as defined in claim 1, including a graduated scale secured to said support adjacent said predetermined path in which said camera moves relative to said support, and scale reader means mounted for movement with said camera and disposed in registering, operative relation to said scale to produce a signal indicative of the position of said camera along said path.

13. Apparatus as defined in claim 1, wherein said fixed telecentric lens system comprises, a plurality of imaging lenses fixed on said support coaxially of each other, and defining an optical axis disposed coaxially of the image detector of said camera, an iris diaphragm secured to said support between said camera and said lenses, and having therein a central opening disposed coaxially of said optical axis, and means responsive to the movement of said camera on said support to adjust the diameter of said opening in said diaphragm.

14. Apparatus as defined in claim 13, wherein said central opening in said diaphragm being axially spaced a fixed distance from said lenses.

15. Apparatus as defined in claim 13, wherein said lenses are secured in contact with each other, and at least one of said lenses is a magnifying lens.

16. In video based metrological apparatus of the type in which the magnified image of a workpiece, which is positioned on a work supporting surface, is projected by a plurality of imaging lenses to a video camera for recording and display thereby, an improved variable magnification system, comprising a support having a video camera mounted for limited reciprocation thereon, and with the image detector of the camera facing a workpiece secured on said supporting surface, a set of telecentric imaging lenses secured on said support between said camera and said workpiece, and with the optical axis of said imaging lenses being disposed coaxially of the image detector of said camera, an adjustable iris diaphragm secured on said support between said camera and said set of lenses and having through the center thereof an adjustable opening disposed coaxially of said optical axis, drive means for selectively moving said camera in a predetermined path on said support toward and away from iris diaphragm and said imaging lenses to alter the magnification of the image projected to said camera, and means mounting said support for limited reciprocation parallel to said optical axis selectively to move said camera, said diaphragm and said imaging lenses in unison toward and away from said workpiece to focus said image thereof at said camera.

17. Apparatus as defined in claim 16, wherein said imaging lenses are fixed with respect to each other on said support.

18. Apparatus as defined in claim 16, including means connecting said iris diaphragm to said drive means for said camera to effect adjustment of the diameter of said opening in said diaphragm in response to the movement of said camera on said support.

19. Apparatus as defined in claim 16, including means mounted for movement with said camera on said support, and cooperating with means on said support to indicate the position of said camera in said predetermined path.

20. Apparatus as defined in claim 16, wherein said imaging lenses include at least one magnifying lens fixed in axially space confronting relation to said iris diaphragm at the side thereof remote from said camera.

* * * * *